United States Patent Office 3,509,234
Patented Apr. 28, 1970

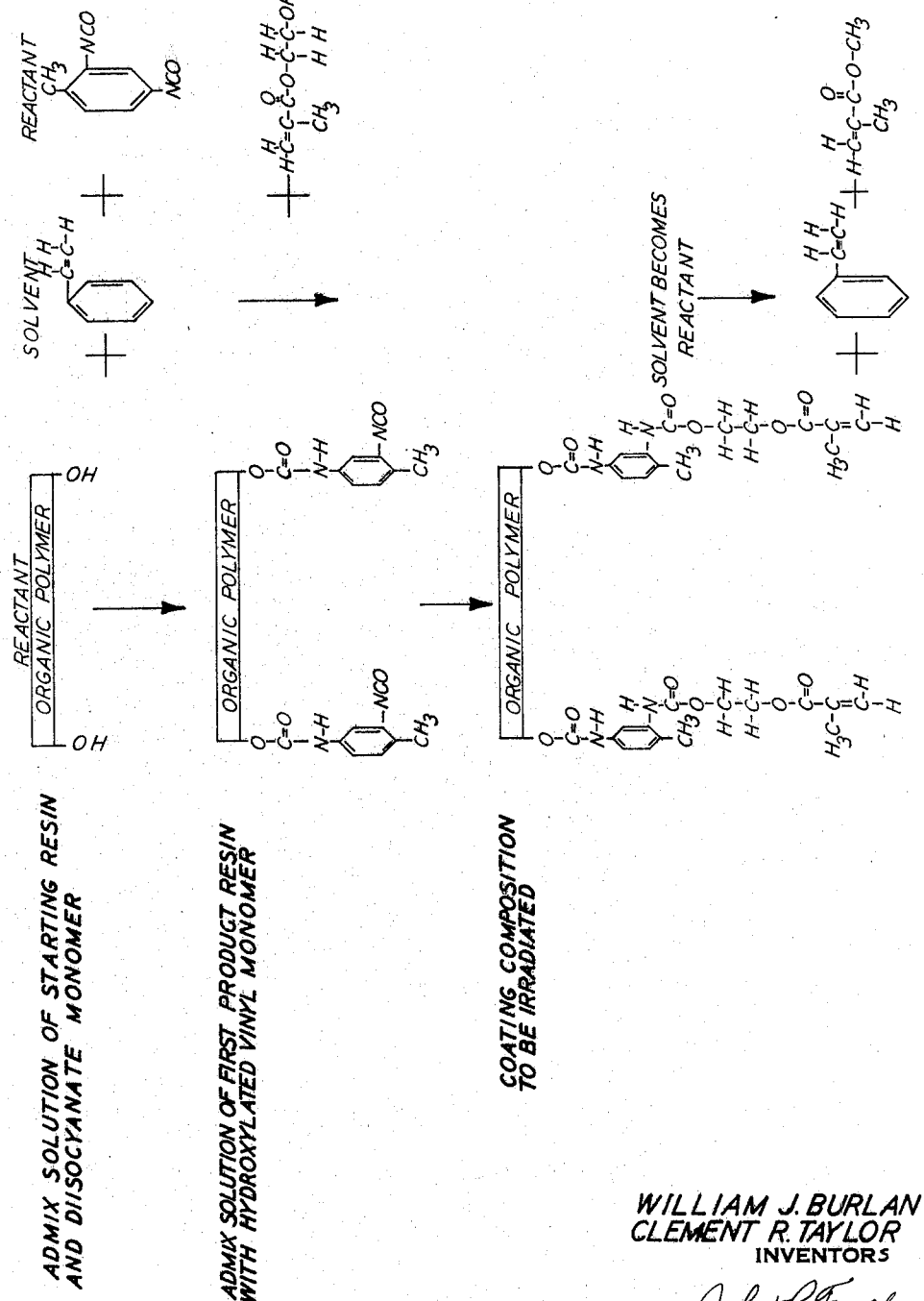

3,509,234
RADIATION CURABLE PAINT BINDERS CONTAINING VINYL MONOMERS AND A HYDROXYLATED POLYMER REACTED WITH A POLYISOCYANATE AND AN HYDROXYL ALKYL ACRYLATE
William J. Burlant, Detroit, and Clement R. Taylor, Birmingham, Mich., assignors to Ford Motor Company, Dearborn, Mich., a corporation of Delaware
Filed Aug. 13, 1965, Ser. No. 479,522
Int. Cl. C08f 21/02, 1/16
U.S. Cl. 260—859                                         13 Claims

ABSTRACT OF THE DISCLOSURE

Urethane-comprising, radiation-curable paints comprising a film-forming solution of vinyl monomers and a paint binder resin formed by first reacting a hydroxylated polymer consisting essentially of carbon, hydrogen and oxygen with a first —NCO group of diisocyanate monomers to provide an isocyanate terminated polymer and subsequently reacting at least a portion of the remaining —NCO groups of said diisocyanate monomers with a hydroxy alkyl acrylate or hydroxy alkyl methacrylate monomer thereby introducing into said resin alpha-beta olefinic unsaturation units each of which are separated from the principal carbon-to-carbon chain of said resin by two urethane groups.

---

This invention relates to the art of coating and is primarily concerned with method and means for providing articles of manufacture, particularly wood and/or metal surfaces thereof, with decorative and abrasion resistant coatings, including improved paints for such purpose, their preparation, application to a substrate and polymerization thereon. More particularly, this invention relates to an improved paint binder comprising a urethane-modified, organic resin and a vinyl monomer which are copolymerizable by ionizing radiation.

In this application the term "paint" is meant to include finely ground pigment and/or filler in the binder, the binder without pigment and/or filler or having very little of the same, but which can be tinted if desired, and other surface coating compositions containing the binder which might be considered to be broadly analogous to enamel, varnish, or lacquer bases. Thus, the binder which is ultimately converted to a durable film resistant to conventional service conditions by final curing, can be all or virtually all that is used to form the film, or it can be a vehicle for pigmentary and/or mineral filler material.

The term "ionizing radiation" as employed herein means radiation having sufficient energy to remove an electron from a gas atom, forming an ion pair, and hence radiation with energy of, or equivalent to, 5,000 electron volts is operative for effecting polymerization of the paint films herein disclosed. The preferred method of curing films of the instant paint binders upon the substrates to which they have been applied is by subjecting such films to a beam of polymerization effecting electrons which at its source of emission is within the range of, or equivalent to, 150,000 to 450,000 electron volts. In this method of curing it is preferred to employ a minimum of 25,000 electron volts per inch of distance between the radiation emitter and the workpiece where the intervening space is occupied by air. Adjustment is made for the relative resistance of the intervening gas which is preferably an oxygen-free, inert gas such as nitrogen or helium. While it is preferred to utilize polymerization effecting electrons to effect curing, it will be understood that such curing may be effected using either that which is conventionally termed "high energy particle radiation" or "ionizing electromagnetic radiation."

The term "vinyl" as employed herein refers to any organic polymer or monomer having a

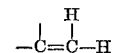

terminal grouping. The paint binders employed herein comprise at least one organic resin having about 0.5 to about 3, preferably 1 to 2, and more preferably 1.25 to 1.75, vinyl unsaturation units per 1,000 units molecular weight and a plurality of urethane groups within its molecular structure and at least one, preferably at least two dissimilar, vinyl monomers, e.g. a vinyl hydrocarbon such as styrene and an acrylic monomer such as methyl methacrylate. The term "acrylic monomer" as used herein means an alpha-beta monounsaturated monocarboxylic acid or esters thereof and includes, but not by way of limitation, acrylic acid, alkacrylic acids, e.g. methacrylic acid, monohydric and polyhydric alcohol esters of acrylic acid and alkacrylic acids, other oxygenated derivatives of acrylic acid and alkacrylic acids, e.g. glycidyl methacrylate, 2-hydroxyethyl methacrylate, etc., and in special situations halogenated derivatives of the same, e.g. chloroacrylic acid and esters thereof.

The binder is preferably applied to the substrate and cured thereon as a continuous film of substantially even depth, preferably a depth in the range of about 0.1 to about 4.0 mils depending upon the substrate and the intended end use of the coated product. The paint binder may be applied to the substrate by conventional spray techniques in which case it has a viscosity below about 50, preferably about 10 to about 35, seconds (Ford Cup), or by brushing, roll coating, flow coating, or by the method commonly termed the silk screen process with appropriate adjustment in viscosity. The film-forming material should have a viscosity low enough to permit rapid application to the substrate in substantially even depth and high enough so that a 1 mil (.001") film will hold upon a vertical surface without sagging. The viscosity of the binder is adjusted by varying the molecular weight of the resin or resins and/or by varying the relative concentrations of the resin component and/or by varying the relative concentrations of dissimilar monomers within the monomer component. The binder is preferably applied to the substrate essentially free of nonpolymerizable organic solvents and/or diluents.

Films formed from the preferred embodiments of the paints of this invention are cured at relatively low temperatures, e.g. between room temperature (20 to 25° C.) and the temperature at which significant vaporization of its most volatile component is initiated. Such films are converted by the electron beam into tenaciously bound, wear and weather resistant, coatings which meet the following specifications:

| Substrate applicability | Type of exposure | Requirements of test |
|---|---|---|
| Wood or metal | Room temperature water soak. | Withstand 240 hours immersion in water at 20 to 25° C. (68 to 77° F.) without significant loss of gloss or film integrity-i.e. without blistering, checking, cracking or peeling. |
| Wood | Cyclic boiling and baking. | Withstand 25 cycles, each 4 hours immersion in boiling water followed by 15 hours drying at 62 to 63° C. (about 144 to 146° F.), without significant loss of gloss or film integrity. |
| Metal | Elongation | Withstand 25% elongation without rupture, 1 to 2 mil coating, 1/8" mandrel. |
| Wood or metal | Ultraviolet | Withstand 2,000 hours exposure in Standard Atlas Ultraviolet Carbon Arc Weatherometer test without significant chalking and without loss of gloss or film integrity. |

The urethane-modified resins used in the paint binders of this invention are prepared from a suitable organic resin, a diisocyanate monomer and a suitable vinyl monomer.

Suitable starting resins have in their molecular structure a plurality of hydrogen atoms which are labile with respect to an isocyanate group, e.g. a labile hydrogen of an amine, amide, alcohol or carboxylic acid. To avoid repetition explanation the description is hereinafter confined to hydroxylated starting resins.

The hydroxylated starting resins may be tailored in its preparation so as to assist in providing the desired end properties for the paint and in such preparation the number of hydroxyl groups per 1,000 units molecular weight may be varied. As a minimum the starting resin will contain sufficient hydroxyl groups to permit sufficient addition reaction with diisocyanate monomers and their subsequent reaction with hydroxylated vinyl monomers to provide the resin used in the binder with the requisite vinyl unsaturation, i.e. about 0.5 to about 3 groups per 1,000 units molecular weight. Although not restricted to such elements, the starting resin will ordinarily consist of carbon, hydrogen and oxygen. To assist in providing the binder resin with a high resistance to weathering and to assist in providing the uncured binder with the ability to resist sagging upon a vertical surface, the starting resin should have a molecular weight of at least about 900.

In a first embodiment the starting resin is an alkyd type polyester which may or may not have olefinic carbon to carbon unsaturation. Broadly, this group encompasses the alkyd resins which are the polymeric reaction product of a polyhydric alcohol and a dicarboxylic acid or anhydride, e.g. maleic, fumaric, itaconic, mesaconic, etc., in the case of the unsaturated alkyds and succinic, adipic, etc., in the case of the carbon to carbon saturated alkyds.

The preferred polyester resins are prepared from an acyclic dibasic acid or anhydride, e.g. maleic anhydride, succinic acid, etc., an aliphatic, cyclic, dibasic acid or anhydride, e.g. tetrahydrophthalic anhydride, 1,4-cyclohexanedicarboxylic acid, etc., and a branched chain polyhydric alcohol, e.g. neopentyl glycol. In one embodiment all or a portion of the branched chain polyhydric alcohol is replaced with a straight chain polyhydric alcohol, e.g. 1,4-butanediol. A cyclic aromatic dibasic acid or anhydride, e.g. phthalic anhydride, may be used but aliphatic cyclic acids are preferred.

The alkyd type polyester resins employed herein have molecular weights in the range of about 900 to about 10,000, preferably above about 2,500, and an acid number in the range of about 5 to about 50, preferably below about 20.

In a second embodiment the starting resin is prepared by the copolymerization of acrylic monomers, at least one of which provides a labile hydrogen after such polymerization. Insofar as acrylate and methacrylate monomers are used in this polymerization, the acrylic resins also have a plurality of ester linkages. Ordinarily, the monomers will include one which contains a free or dissociable hydroxyl group. The term "acrylic resin" as employed herein means a resin formed exclusively from acrylic monomers. The term "modified-acrylic resin" as employed herein means a resin formed from a major amount of acrylic monomers and a minor amount of non-acrylic monomers. The acrylic resins and the modified-acrylic resins when employed herein as starting materials for the preparation of the urethane-modified paint binder resins may have molecular weights as high as 1,000,000, preferably in the range of about 5,000 to about 25,000, particularly in those applications in which the paint binder is to be applied by conventional spray methods.

Referring now to the accompanying drawing, in the preferred manner of preparing the urethane-modified binder resins the starting resin is placed in solution with a suitable solvent. The solvent preferably is one or more of the vinyl monomers which will be used later in the monomeric component of the paint binder, e.g. styrene, in which case solvent removal is unnecessary. To the resin solution a diisocyanate monomer is added slowly with continuous stirring. The resultant reaction between one of the isocyanate groups of the monomer and a hydroxyl group of the starting resin is exothermic and self-generating. With certain diisocyanates, e.g. 2,4-diisocyanate, one of the two isocyanate groups reacts with a hydroxyl group at a much greater rate than does its companion and hence cross linking of two hydroxyl groups on the same or different resin molecules can be essentially eliminated by controlling the number of available hydroxyl groups on the resin and/or by limiting the exclusiveness of the first reaction by timely introduction of the hydroxylated vinyl monomer. With other diisocyanates, e.g. hexamethylene diisocyanate, the two isocyanate groups react at the same or nearer the same rate and a greater amount of resin to resin cross linking will occur. By utilizing a mixture of diisocyanate monomers, e.g. 2,4-tolylene diisocyanate and hexamethylene diisocyanate, the degree of diisocyanate-resin cross linking and hence the concentration of urethane groups in the final coating can be adjusted. The diisocyanates which may be used include 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, hexamethylene diisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, 3,3'-dimethoxy 4,4'-dimethyl 4,4'-biphenylene diisocyanate, durene diisocyanate, 1-phenoxy-2,4-phenylene diisocyanate, 1-tert-butyl-2,4-phenylene diisocyanate, etc. Many of the foregoing while operable are prohibitively expensive for use in any large scale coating operation. In special applications it may be advantageous to utilize one of the halogenated diisocyanates, e.g. 1-chloro-2,4-phenylene diisocyanate. In one preferred embodiment at least as many diisocyanate molecules are charged as there are reactive hydroxy groups on the starting resin.

To the first product resin still in solution with the vinyl monomer solvent is added a vinyl monomer having a hydrogen atom labile with respect to an isocyanate group, e.g. a hydroxylated vinyl monomer having about 3 to about 12 carbon atoms per molecule. The vinyl monomer is added slowly with continuous stirring. The resultant reaction between the second and unreacted isocyanate group of the diisocyanates, which are now a part of the resin, is exothermic and self-generating. The second product resin still in solution with the vinyl monomer solvent is ready for use in the paint binders of this invention. To this solution may be added an additional quantity of the vinyl monomer used as solvent or, more commonly, a second vinyl monomer to complete the paint binder.

The hydroxylated vinyl monomer reacted with the second isocyanate group of the diisocyanate is preferably an acrylic monomer as hereinbefore defined. It will be understood, however, that such compound may be an acid, aldehyde, ester, amide, or an epoxide in addition to being in the broad sense an alcohol and that nonacrylic vinyl monomers may be used.

Where it is desirable to incorporate a greater concentration of diisocyanate monomers in the binder resin without increasing the unsaturation provided by the addition of hydroxylated vinyl monomers, a greater number of hydroxyl groups may be present in the starting resin permitting union of such resin with a greater number of diisocyanate monomers, then carrying out the second stage reaction between the first product resin and the hydroxylated vinyl monomer using less than stoichiometric amounts of the hydroxylated vinyl monomer. In this case the other diisocyanate groups should be coupled with a saturated alcohol monomer in like manner. Lesser alcohols, e.g. methyl alcohol, can be used for this purpose.

The paint binder solution advantageously contains about 30 to about 70, preferably 40 to 60, percent of the urethane-modified binder resin and about 30 to about 70, preferably 40 to 60, percent of unpolymerized vinyl monomers. In a preferred embodiment the vinyl monomers of the paint binder are a mixture of about 30 to about 70, preferably 40 to 60, and more preferably 45 to 55, percent acrylic monomers with the balance non-acrylic vinyl monomers. For example, increased weathering resistance can be obtained by increased concentration of an acrylic monomer such as methyl methacrylate while a lowering of the requisite radiation dosage can be obtained by increasing the concentration of a vinyl hydrocarbon monomer such as styrene and the respective quantities of such monomers may be adjusted to fit the individual need.

The urethane-modified resins in the exemplary paint binders each have molecular weights in excess of 1,000 and the binder solutions when applied and cured in accordance with this invention meet the specifications hereinbefore set forth.

EXAMPLE 1

A polyester resin, hereinafter designated Resin A, is prepared from the following monomers:

|  | Mols | Grams |
| --- | --- | --- |
| Succinic acid | 2.88 | 340.1 |
| Tetrahydrophthalic anhydride | 9.12 | 1387.6 |
| 1,2-propanediol | 13.20 | 1004.4 |

The monomers with 200 cc. xylene are subjected to a solvent cook over a period of 10 hours gradually raising the temperature to 260° C. The resultant resin has an acid number of about 5.7. The xylene is separated from the resin and a solution of the resin in styrene is prepared to which is sequentially added tolylene diisocyanate and 2-hydroxyethyl methacrylate. The composition of this reaction mixture is as follows:

|  | Mols | Grams |
| --- | --- | --- |
| Resin A |  | 200 |
| Tolylene diisocyanate app. 80% 2,4- 20% 2,6- | 0.1 | 17.4 |
| Styrene | 0.82 | 86 |
| 2-hydroxyethyl methacrylate | 0.1 | 13 |

The addition of the diisocyanate is made slowly and incrementally and the charge is continuously stirred over a period of 5.5 hours to form Resin B. The methacrylate is then added slowly and incrementally and the charge is continuously stirred over a period of 25 hours to form Resin C.

The monomer content is adjusted to provide a paint binder spray containing 60% Resin C and 40% styrene. The binder is sprayed upon wood panels and irradiated. The coating is irradiated with an electron beam. The conditions of irradiation are as follows:

Potential—260 kv.
Current—1 milliampere
Dose rate—5 mrad/pass
Passes—2
Line speed—1.6 cm./sec.
Distance, emitter to workpiece—10.0 inches
Total dose—10.0 mrad

EXAMPLE 2

The procedure of Example 1 is repeated except that 50% of the 1,2-propanediol is replaced with an equimolar amount of neopentyl glycol.

EXAMPLE 3

The procedure of Example 1 is repeated except that 50% of the 1,2-propanediol is replaced with an equimolar amount of pentaerythritol.

EXAMPLE 4

The procedure of Examples 2 and 3 are repeated except that the tolylene diisocyanate component is increased from 0.1 mol to 0.15 mol and 0.05 mol methyl alcohol is admixed with the 2-hydroxyethyl methacrylate.

EXAMPLE 5

An acrylic resin is prepared from the following monomers:

|  | Mols | Grams |
| --- | --- | --- |
| Methy methacrylate | 0.300 | 30.0 |
| Ethyl acrylate | 0.500 | 50.0 |
| 2-hydroxyethyl methacrylate | 0.154 | 20.0 |

Xylene is heated and stirred under reflux (136° C.) in a 500 cc. four-neck flask equipped with thermometer, stirrer, reflux condenser and dropping funnel with a nitrogen gas inlet. The monomers above listed and 1 gram of benzoyl peroxide are stirred together until complete solution occurs. The mixture then is added dropwise to the refluxing xylene over a period of 2 hours. After addition is complete, the temperature is maintained at 136° C. for 3 hours. The resulting polymer solution is cooled to room temperature 26° C. and 0.154 mol, 22.5 grams, of tolylene diisocyanate, 80% 2,4- and 20% 2,6-di-, is added slowly under a nitrogen blanket with continuous stirring for a period of 5 hours (the exotherm not exceeding about 32° C.) after which 0.154 mol, 20.0 grams, of 2-hydroxyethyl methacrylate is added slowly with continuous stirring for a period of 20 hours.

A paint binder is prepared by adding styrene and methyl methacrylate to the polymer thus prepared.

The paint binder is sprayed on 3 x 5 phosphated steel panels and cured with high energy electrons under the following conditions:

Potential—295 kv.
Current—1.0 milliampere
Distance, emitter to workpiece—10.0 inches
Line speed—1.6 cm./sec.
Atmosphere—Helium
Passes—2
Dose—10 mrad The coatings exhibited a Sward Hardness of 32.

EXAMPLE 6

A paint binder resin is prepared from the following monomers:

| | Mol |
| --- | --- |
| Castor oil (glyceryl ester of ricinoleic acid) | 0.143 |
| Tolylene diisocyanate | 0.386 |
| 2-hydroxyethyl methacrylate | 0.243 |

The diisocyanate is added slowly and incrementally to the castor oil with continuous stirring. After reaction is complete, as evidenced by the exotherm, the hydroxy methacrylate is added slowly and incrementally with continuous stirring.

A paint binder is prepared from the resulting resin (40%), styrene (30%) and methyl methacrylate (30%). Each of the three ricinoleic acid groups of the ester has a dissociable hydroxyl group which is reacted with one —NCO group on the diisocyanate. The second —NCO group of the diisocyanate is then reacted with a hydroxyl group of the 2-hydroxyethyl methacrylate monomer.

The binder is sprayed upon phosphated standard steel panels and irradiated with an electron beam using the following conditions:

Potential—295 kv.
Current—1 milliampere
Line speed—3.2 cm./sec.
Passes—2
Total dose—5 mrad The coating exhibited a Sward Hardness of 14.

EXAMPLE 7

The procedures of each of the preceding examples are repeated except that hexamethylene diisocyanate is substituted for 25% of the tolylene diisocyanate and the resulting resin is employed in a paint binder containing 40 parts by weight of said resin, 35 parts by weight methyl methacrylate and 25 parts by weight styrene.

EXAMPLE 8

The procedures of each of the preceding examples are repeated except that the potential of the electron beam is about 175,000 electron volts with the exposure controlled to provide a total dose equivalent to that of Example 1.

EXAMPLE 9

The procedures of each of the preceding examples are repeated except that the potential of the electron beam is about 400,000 electron volts and the exposure is controlled to provide a total dose equivalent to that of Example 1.

The abbreviation mrad as employed herein means 1,000,000 rad. The term "rad" as employed herein means that dose of radiation which results in the absorption of 100 ergs of energy per gram of absorber, i.e. coating film. The electron emitting means may be a linear electron accelerator capable of producing a direct current potential in the range hereinbefore set forth. In such device electrons are ordinarily emitted from a hot filament and accelerated through a uniform voltage gradient. The electron beam, which may be about ⅛″ in diameter at this point, is then scanned in one direction to make a fan-shaped beam and then passed through a metal window, e.g. a magnesium-thorium alloy of about 0.003″ thickness.

In the method of curing herein disclosed the polymerization effecting radiation energy is applied at dose rates of about 0.1 to about 100 mrad per second upon a preferably moving workpiece with the coating receiving a total dose in the range of about 0.1 to about 100, preferably about 1 to about 25 mrad.

It will be understood by those skilled in the art that modifications can be made within the foregoing examples within the scope of the invention as hereinbefore described and hereinafter claimed.

We claim:
1. A radiation-curable paint comprising a film-forming solution of about 30 to about 70 wt. percent vinyl monomers selected from the group consisting of acrylic monomers and vinyl hydrocarbon monomers and about 30 to about 70 wt. percent of an olefinically unsaturated paint binder resin, said resin being formed by first reacting a hydroxylated polymer consisting essentially of carbon, hydrogen and oxygen atoms with a first —NCO group of diisocyanate monomers to provide an isocyanate terminated polymer and subsequently reacting at least a portion of the remaining —NCO groups of said diisocyanate monomers with a hydroxy alkyl acrylate monomer or hydroxy alkyl methacrylate monomer in an amount sufficient to introduce into said resin about 0.5 to about 3 alpha-beta olefinic unsaturation units per 1,000 units molecular weight of said resin, each of said alpha-beta olefinic unsaturation units being separated from the principal carbon-to-carbon chain of said resin by two urethane groups.

2. A paint binder in accordance with claim 1 wherein said resin has about 1 to about 3 alpha-beta olefinic unsaturation units per 1,000 units molecular weight.

3. A radiation-curable paint binder comprising a film-forming solution of about 30 to about 70 wt. percent vinyl monomers selected from the group consisting of acrylic monomers and vinyl hydrocarbon monomers and about 30 to about 70 wt. percent of an olefinically unsaturated paint binder resin, said resin being formed by first reacting a hydroxylated polymer consisting essentially of carbon, hydrogen and oxygen atoms with a first —NCO group of diisocyanate monomers to provide an isocyanate terminated polymer and subsequently reacting at least a portion of the remaining —NCO groups of said diisocyanate monomers with a hydroxy alkyl acrylate monomer or hydroxy alkyl methacrylate monomer thereby introducing into said resin alpha-beta olefinic unsaturation units each of which are separated from the principal carbon-to-carbon chain of said resin by two urethane groups.

4. A radiation-curable paint binder comprising a film-forming solution of about 30 to about 70 wt. percent vinyl monomers selected from acrylic monomers and vinyl hydrocarbon monomers and about 30 to about 70 wt. percent of an olefinically unsaturated paint binder resin, said resin being formed by first reacting a hydroxyl terminated polyester consisting essentially of carbon, hydrogen and oxygen with a first —NCO group of diisocyanate monomers to provide an isocyanate terminated polymer and subsequently reacting at least a portion of the remaining —NCO groups of said diisocyanate monomers with a hydroxy alkyl acrylate monomer or hydroxy alkyl methacrylate monomer in an amount sufficient to introduce into said resin about 0.5 to about 3 alpha-beta olefinic unsaturation units per 1,000 units molecular weight of said resin, each of said alpha-beta olefinic unsaturation units being separated from the principal carbon-to-carbon chain of said resin by two urethane groups.

5. A paint binder in accordance with claim 4 wherein said resin has about 1 to about 3 alpha-beta olefinic unsaturation units per 1,000 units molecular weight.

6. A radiation-curable paint binder comprising a film-forming solution of about 30 to about 70 wt. percent vinyl monomers and about 30 to about 70 wt. percent of an olefinically unsaturated paint binder resin, said resin being formed by first reacting a hydroxyl terminated polyester consisting essentially of carbon, hydrogen and oxygen atoms with a first —NCO group of diisocyanate monomers to provide an isocyanate terminated polymer and subsequently reacting at least a portion of the remaining —NCO groups of said diisocyanate monomers with a hydroxy alkyl acrylate monomer or a hydroxy alkyl methacrylate monomer thereby introducing into said resin alpha-beta olefinic unsaturation units each of which are separated from the principal carbon-to-carbon chain of said resin by two urethane groups.

7. In a radiation-curable paint binder comprising a film-forming solution of about 30 to about 70 wt. percent of vinyl monomers and from about 30 to about 70 wt. percent an olefinically unsaturated paint binder resin, the improvement wherein said resin is formed by first reacting a hydroxyl terminated polyester consisting essentially of carbon, hydrogen and oxygen atoms with a first —NCO group of diisocyanate monomers to provide an isocyanate terminated polymer and subsequently reacting at least a portion of the remaining —NCO groups of said diisocyanate monomers with a hydroxy alkyl acrylate monomer or hydroxy alkyl methacrylate monomer in an amount sufficient to introduce into said resin about 0.5 to about 3 alpha-beta olefinic unsaturation units being separated from the principal carbon-to-carbon chain of said resin by two urethane groups.

8. In a radiation-curable paint binder comprising a film-forming solution of about 30 to about 70 wt. percent of vinyl monomers and from about 30 to about 70 wt. percent an olefinically unsaturated paint binder resin, the improvement wherein said resin is formed by first reacting a hydroxyl terminated polyester consisting essentially of carbon, hydrogen and oxygen atoms with a first —NCO group of diisocyanate monomers to provide an isocyanate terminated polymer and subsequently reacting at least a portion of the remaining —NCO groups of said diisocyanate monomers with a hydroxy alkyl acrylate monomer or hydroxy alkyl methacrylate monomer thereby introducing into said resin alpha-beta olefinic unsaturation units each of which are separated from the principal carbon-to-carbon chain of said resin by two urethane groups.

9. A radiation-curable paint binder comprising a film-forming solution of about 30 to about 70 wt. percent vinyl monomers and about 30 to about 70 wt. percent of an olefinically unsaturated paint binder resin, said resin being formed by first reacting a hydroxylated polymer of vinyl monomers consisting essentially of carbon, hydrogen and oxygen atoms with a first —NCO group of diisocyanate monomers to provide an isocyanate terminated polymer and subsequently reacting at least a portion of the remaining —NCO groups of said diisocyanate monomers with a hydroxy alkyl acrylate monomers or hydroxy alkyl methacrylate monomer in an amount sufficient to introduce into said resin about 0.5 to about 3 alpha-beta olefinic unsaturation units per 1,000 units molecular weight of said resin, each of said alpha-beta olefinic unsaturation units being separated from the principal carbon-to-carbon chain of said resin by two urethane groups.

10. A paint binder in accordance with claim 9 wherein said resin has about 1 to about 3 alpha-beta olefinic unsaturation units per 1,000 units molecular weight.

11. A radiation curable paint binder comprising a film-forming solution of about 30 to about 70 wt. percent vinyl monomers and about 30 to about 70 wt. percent of an olefinically unsaturated paint binder resin, said resin being formed by first reacting a hydroxylated polymer of vinyl monomers consisting essentially of carbon, hydrogen and oxygen atoms with a first —NCO group of diisocyanate monomers to provide an isocyanate terminated polymer and subsequently reacting at least a portion of the remaining —NCO groups of said diisocyanate monomers with a hydroxy alkyl acrylate monomer or hydroxy alkyl methacrylate monomer thereby introducing into said resin alpha-beta olefinic unsaturation units each of which are separated from the principal carbon-to-carbon chain of said resin by two urethane groups.

12. In a radiation-curable paint binder comprising a film-forming solution of about 30 to about 70 wt. percent of vinyl monomers and from about 30 to about 70 wt. percent an olefinically unsaturated paint binder resin, the improvement wherein said resin is formed by first reacting a hydroxylated polymer of vinyl monomers consisting essentially of carbon, hydrogen and oxygen atoms with a first —NCO group of diisocyanate monomers to provide an isocyanate terminated polymer and subsequently reacting at least a portion of the remaining —NCO groups of said diisocyanate monomers with a hydroxyl alkyl acrylate monomer or hydroxy alkyl methacrylate monomer in an amount sufficient to introduce into said resin about 0.5 to about 3 alpha-beta olefinic unsaturation units per 1,000 units molecular weight of said resin, each of said alpha-beta olefinic unsaturation units being separated from the principal carbon-to-carbon chain of said resin by two urethane groups.

13. In a radiation-curable paint binder comprising a film-forming solution of about 30 to about 70 wt. percent of vinyl monomers and from about 30 to about 70 wt. percent an olefinically unsaturated paint binder resin, the improvement wherein said resin is formed by first reacting a hydroxylated polymer of vinyl monomers consisting essentially of carbon, hydrogen and oxygen atoms with a first —NCO group of diisocyanate monomers to provide an isocyanate terminated polymer and subsequently reacting at least a portion of the remaining —NCO groups of said diisocyanate monomers with a hydroxyl alkyl acrylate monomer or hydroxy alkyl acrylate monomer thereby introducing into said resin alpha-beta olefinic unsaturation units each of which are separated from the principal carbon-to-carbon chain of said resin by two urethane groups.

References Cited

UNITED STATES PATENTS

| | | | |
|---|---|---|---|
| 2,958,704 | 11/1960 | Dinbergs | 260—468 |
| 3,008,917 | 11/1961 | Park | 260—859 |
| 3,028,367 | 4/1962 | O'Brien | 260—77.5 |
| 3,047,530 | 7/1962 | Nischk | 260—859 |
| 3,178,380 | 4/1965 | Porret | 260—77.5 |
| 3,245,941 | 4/1966 | Mayer | 260—77.5 |
| 3,284,415 | 11/1966 | Horvath | 260—77.5 |
| 3,288,883 | 11/1966 | Temin | 260—859 |
| 3,304,273 | 2/1967 | Stamberger | 260—859 |
| 3,313,789 | 4/1967 | Haarmaann | 260—77.5 |
| 3,367,992 | 2/1968 | Bearden | 260—837 |
| 3,297,745 | 1/1967 | Fekete | 260—77.5 |
| 3,368,988 | 2/1968 | Sekmakas | 260—77.5 |

FOREIGN PATENTS

| | | |
|---|---|---|
| 743,514 | 1/1956 | Great Britain. |
| 571,509 | 3/1959 | Canada. |
| 1,291,153 | 3/1962 | France. |
| 1,307,669 | 9/1962 | France. |
| 1,317,642 | 1/1963 | France. |

SAMUEL H. BLECH, Primary Examiner

P. LIEBERMAN, Assistant Examiner

U.S. Cl. X.R.

117—93.3, 93.31, 132, 148; 204—159.15, 159.16; 260—22, 75, 77.5